US008876129B2

(12) United States Patent
Pizzi Spadoni (10) Patent No.: US 8,876,129 B2
(45) Date of Patent: Nov. 4, 2014

(54) FIELD LITTER SUPPORT

(75) Inventor: Luigi Cesare Pizzi Spadoni, Collecchio (IT)

(73) Assignee: Spencer Italia S.r.l., Collecchio (PR) (IT)

(*) Notice: Subject to any disclaimer, the term of this patent is extended or adjusted under 35 U.S.C. 154(b) by 141 days.

(21) Appl. No.: 13/534,408

(22) Filed: Jun. 27, 2012

(65) Prior Publication Data

US 2013/0001907 A1    Jan. 3, 2013

(30) Foreign Application Priority Data

Jun. 28, 2011    (IT) .............................. PR2011A0059

(51) Int. Cl.
*B62B 1/12* (2006.01)
*A61G 1/013* (2006.01)
*A61G 1/02* (2006.01)
*B60S 9/04* (2006.01)

(52) U.S. Cl.
CPC . *A61G 1/013* (2013.01); *B62B 1/12* (2013.01); *B60S 9/04* (2013.01); *A61G 1/0293* (2013.01)
USPC .......... 280/47.33; 280/38; 280/607; 280/638; 280/639; 280/640; 280/641; 280/655

(58) Field of Classification Search
None
See application file for complete search history.

(56) References Cited

U.S. PATENT DOCUMENTS

| 4,964,650 | A  | * | 10/1990 | Dickinson | 280/641 |
|---|---|---|---|---|---|
| 6,976,696 | B2 | * | 12/2005 | O'Krangley et al. | 280/640 |
| 7,044,496 | B2 | * | 5/2006 | Holmes | 280/639 |
| 7,448,632 | B1 | * | 11/2008 | Nieto | 280/47.24 |
| 7,547,037 | B2 | * | 6/2009 | Poppinga et al. | 280/651 |
| 7,766,365 | B2 | * | 8/2010 | Darling, III | 280/640 |
| 2009/0165208 | A1 | * | 7/2009 | Reed et al. | 5/611 |
| 2011/0049841 | A1 | * | 3/2011 | Limontini | 280/640 |
| 2011/0099717 | A1 | * | 5/2011 | Windauer | 5/627 |

FOREIGN PATENT DOCUMENTS

CH            168874           4/1934

OTHER PUBLICATIONS

Search Report dated Feb. 9, 2012 in corresponding Italian Application PR20110059.

* cited by examiner

*Primary Examiner* — J. Allen Shriver, II
*Assistant Examiner* — Hilary L Johns
(74) *Attorney, Agent, or Firm* — Young & Thompson (57) ABSTRACT

A field litter support (1) includes two side structures (2, 3), each supporting at least one wheel (4) in order to define a frame (40), connecting devices (38a, 38b, 38c, 38d) for attaching a litter (100) to the frame (40), elements (5) adapted to reciprocally move the side structures (2, 3) and a mechanism (6) for blocking the elements (5), and therefore the structures (2, 3), in a predetermined position, attachable to the structures (2, 3). The structures (2, 3) are reciprocally moved close or away along the axis (60) of the wheels (4) without removing the frame (40). This characteristic, however, does not jeopardize the size, because, once the field litter support (1) has been packaged, it has a size equivalent to the one of the closed field litter supports of the prior art.

19 Claims, 12 Drawing Sheets

FIELD LITTER SUPPORT

BACKGROUND OF THE INVENTION

1. Field of the Invention

The present invention refers to the field of the field litter supports.

2. Description of the Related Art

As it is known, the field litter supports, adapted to support different types of field, emergency litters, spinal boards, and scoop stretchers, substantially comprise a frame equipped with big wheels, characterized by the fact it can be packaged in order to be easily transported.

Unfortunately, the packaging step of the litter supports of the prior art is time consuming because it is necessary each time to remove the wheels and put them in another place, in some litter support types, in a suitable compartment which is formed in the closed structure, in other types.

This steps of connecting or disconnecting the wheels from the frame, besides the fact they are provided with fast attaching and detaching systems, slow the steps of preparing the litter support, and are rather troublesome.

SUMMARY OF THE INVENTION

It is an object of the present invention to solve the above mentioned problems by providing a further litter support adapted to be folded in a simple way and without removing its wheels.

Therefore, the main advantage consists of having a litter support which is certainly more handy than the litter support of the prior art, by keeping at the same time the size of the folded litter supports of the prior art.

Said objects and advantages are all met by the field litter support, object of the present invention, which is characterized by what is recited in the attached claims.

BRIEF DESCRIPTION OF THE DRAWING FIGURES

This and other characteristics will be better pointed out by the following description of a preferred embodiment shown, as an exemplifying and non limiting example, in the attached drawings.

DETAILED DESCRIPTION OF THE INVENTION

Particularly referring to the figures, 1 generally indicates a field litter support of the type comprising a frame 40 equipped with at least two wheels 4 and connecting devices 38a, 38b, 38c and 38d for attaching a litter 100 (an emergency, field litters, spinal board or scoop stretcher) to said frame 40.

For the sake of the description simplicity, it is considered a frame 40 formed by two side structures 2 and 3, each supporting a wheel 4.

Said field litter support 1, according to the present invention, also comprises:

means 5 integral with said side structures 2, 3 which enable to reciprocally move close or away structures 2, 3 along an axis 60 passing through the center of said wheels 4;

a mechanism 6 for blocking means 5, and therefore structures 2, 3, in a predetermined position, connectable to the same structures 2, 3.

For the sake of simplicity, since said side structures 2 and 3 are identical, it will be described just one of the two.

The side structure 2 of the frame 4 consists of a tubular element 7 substantially forming a closed circuit. In fact, it is possible to distinguish two posts 7a connected at the top by a portion 7b having the shape of a handle and at the bottom by a portion 7c having the shape of an arc.

Wheel 4 is rotatably connected to the center of said arc-shaped portion 7c and is integral with it, in a way so that during the step of closing the device, it is not necessary to remove the wheel from its seat as it is instead done with the devices of the prior art.

The means 5 adapted to move close or away said side structures 2, 3 are formed by four rods 8, 9, 10, and 11 arranged as a pantograph, in other words, there are coupled two by two, centrally pivoted in hinge points 12 and 13 and parallelly located one to the other.

Each of said rods 8, 9, 10, and 11 has at their respective ends eyelets 8a, 8b, 9a, 9b, 10a, 10b, 11a and 11b engaging upwardly and downwardly four bars 14, 15, 16, and 17, hinged to the side structures 2 and 3, forming in this way rotating pairs. In fact, during the step of opening and/or closing the field litter support 1, by the force applied by an user to said side structures 2 and 3 of frame 40, the rods 8, 9, 10, and 11 rotate around said four bars 14, 15, 16, and 17.

Figure 3:
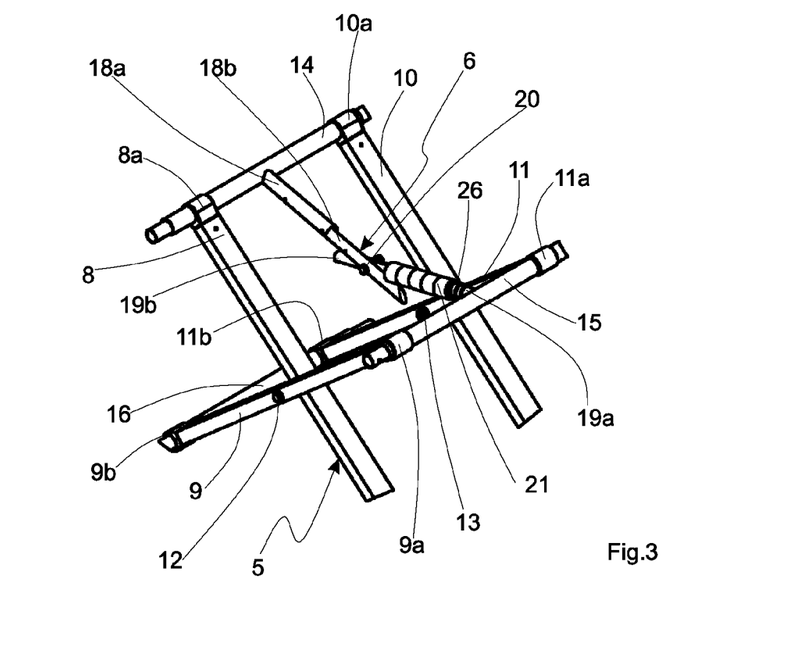
FIG. 3 shows an enlarged view of a detail of the litter support in the opening or closure step.
Figure 4:
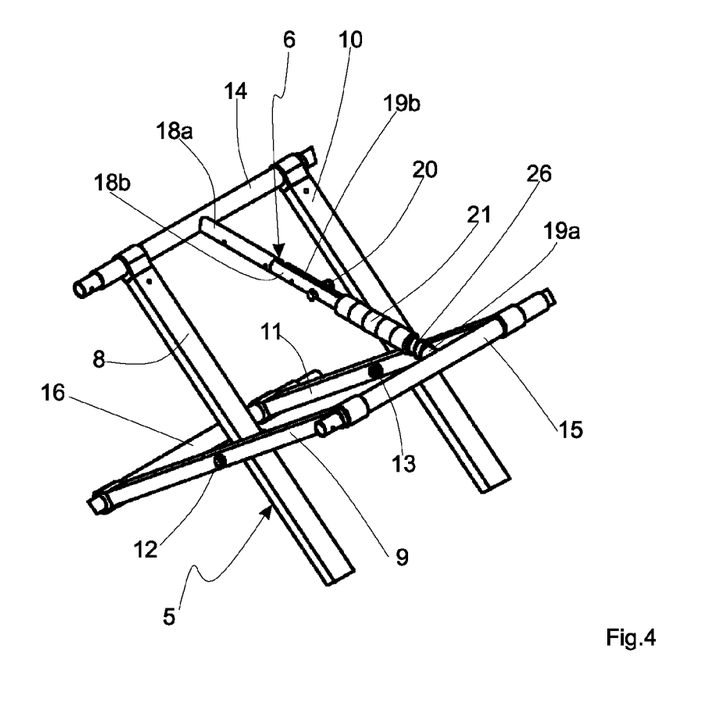
FIG. 4 shows an enlarged view of a detail of the litter support in an opened arrangement.

As it is clearly shown in FIGS. 3 and 4, the mechanism 6 for blocking means 5 is integral with bars 14, 15 inserted by their ends in openings 22, 23, 24, and 25 present in the side structures 2, 3 wherein they can freely rotate.

Moreover, each bar 14 and 15 supports, approximately midway along its length, a further rod 18 and 19 respectively connected to bars 14 and 15, for example by means of hooking means or by welding.

By considering, for example, rod 18: the first half 18a from the side of the bar 14 has a cylindrical shape, while the second half 18b has the same of a half of cylinder. The same is true for the rod 19 having a first cylindrical half 19a on the side of the bar 15 and a second half 19b having the shape of a half of cylinder.

Said rods 18 and 19 are hinged one to the other in a hinge point 20 present in the corresponding second halves 18b and 19b.

It is pointed out that said rods 18 and 19, after having being rotated around the hinge point 20 and having being taken on the same horizontal axis, they jointly form only one stiff rod (FIG. 4).

The mechanism 6 for blocking the two side structures 2, 3 is characterized by a sleeve 21 splined to the rod 19 and abutting against elastic means 26 (for example a spring) located between the rod 15 and the sleeve 21.

During the operation, when the rod 19 moves to the same horizontal axis of rod 18, the sleeve 21, urged by the elastic means 26, moves along the rod 19 and covers the hinge point 20 by blocking in this way the rotation of said rods 18 and 19. In other words, the sleeve 21 blocks the rods 18 and 19, horizontally located, and consequently blocks the same field litter support 1.

Figure 1:
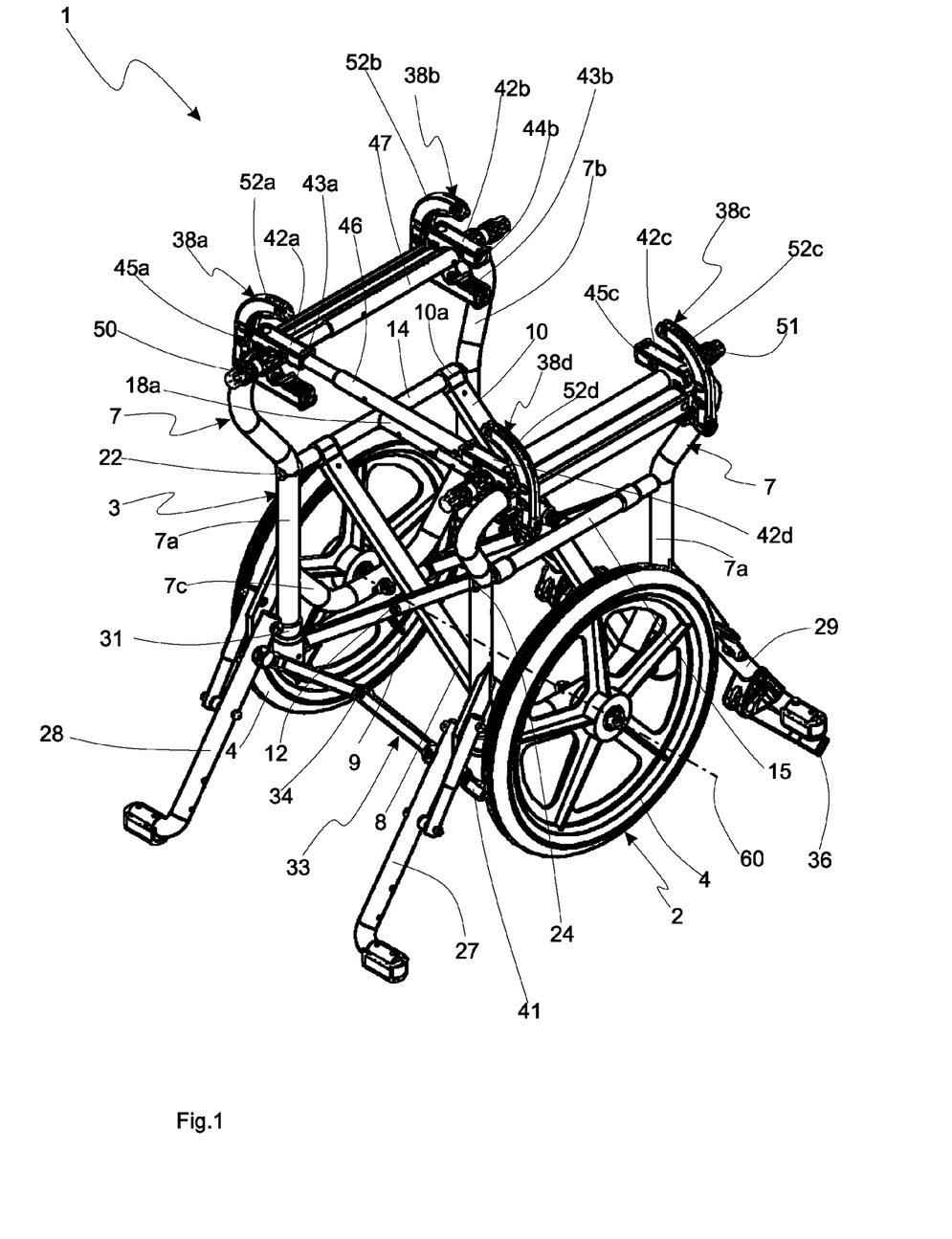
FIG. 1 shows a perspective view of the opened litter support according to the present invention.
Figure 6:
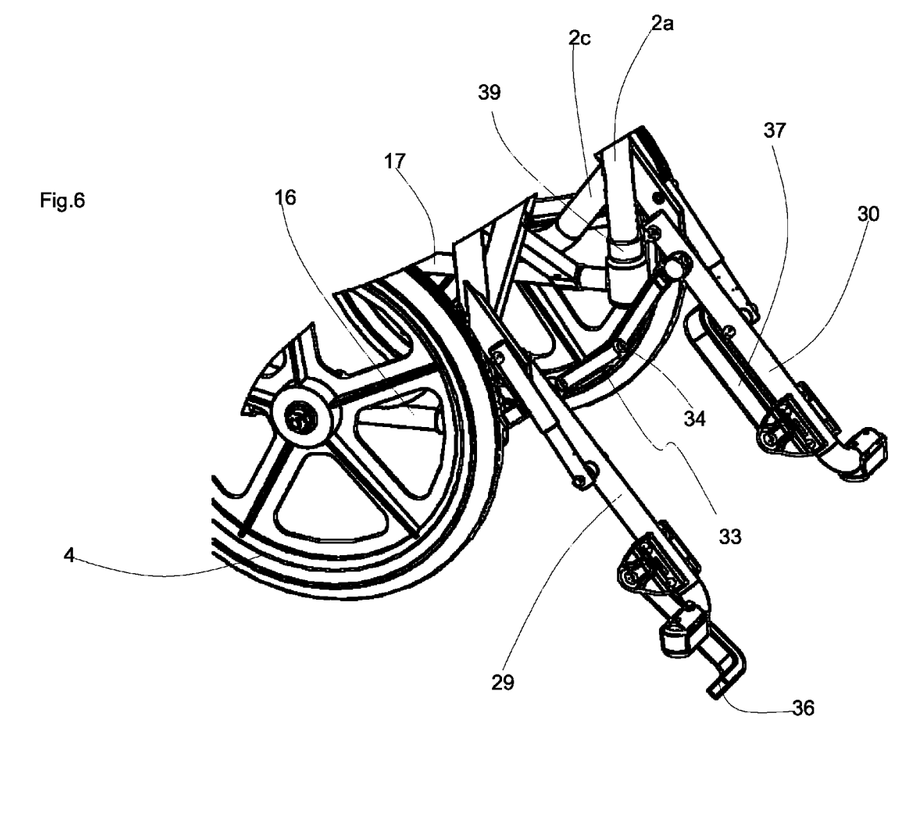
FIG. 6 shows an enlarged partial view of a further detail of the invention.

The field litter support 1 is provided with two front foldable bucks 27 and 28 and two back foldable bucks 29 and 30, which are identical, fixable to the side structures 2 and 3 by means of straps which are hinged to said bucks 27, 28, 29, and 30, the bucks can vertically rotate around the straps in order to occupy two positions corresponding to the opening and closure of the field litter support 1 (FIGS. 1 and 6).

Figure 5:
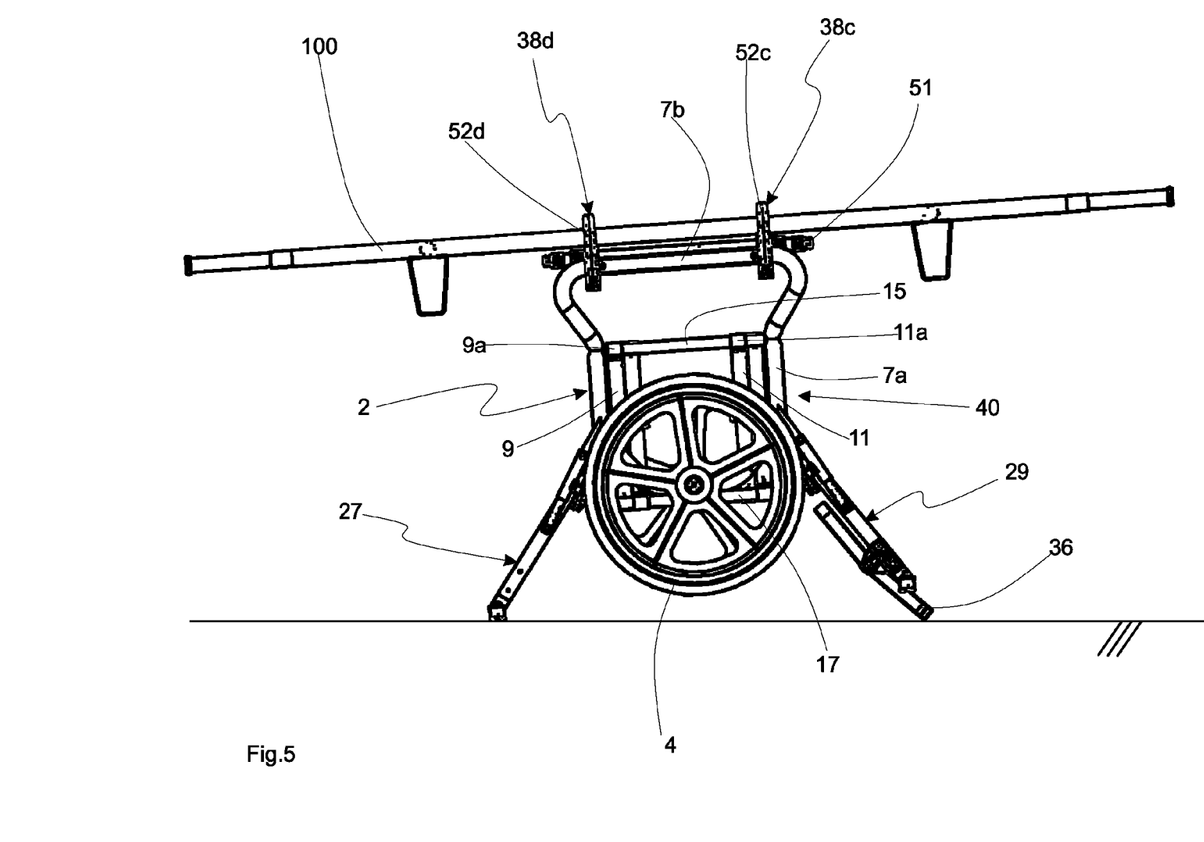
FIG. 5 shows a side view of the litter support with a litter mounted on it.

Said bucks 27, 28, 29, and 30 are necessary if the field litter support 1 is parked for loading/unloading a litter 100, or for causing the patient to take the Trendeleburg posture on said litter 100, that is the legs are higher than the rest of the body (FIG. 5) or the anti-Trendeleburg posture, that is the legs are lower than the rest of the body.

Figure 2:
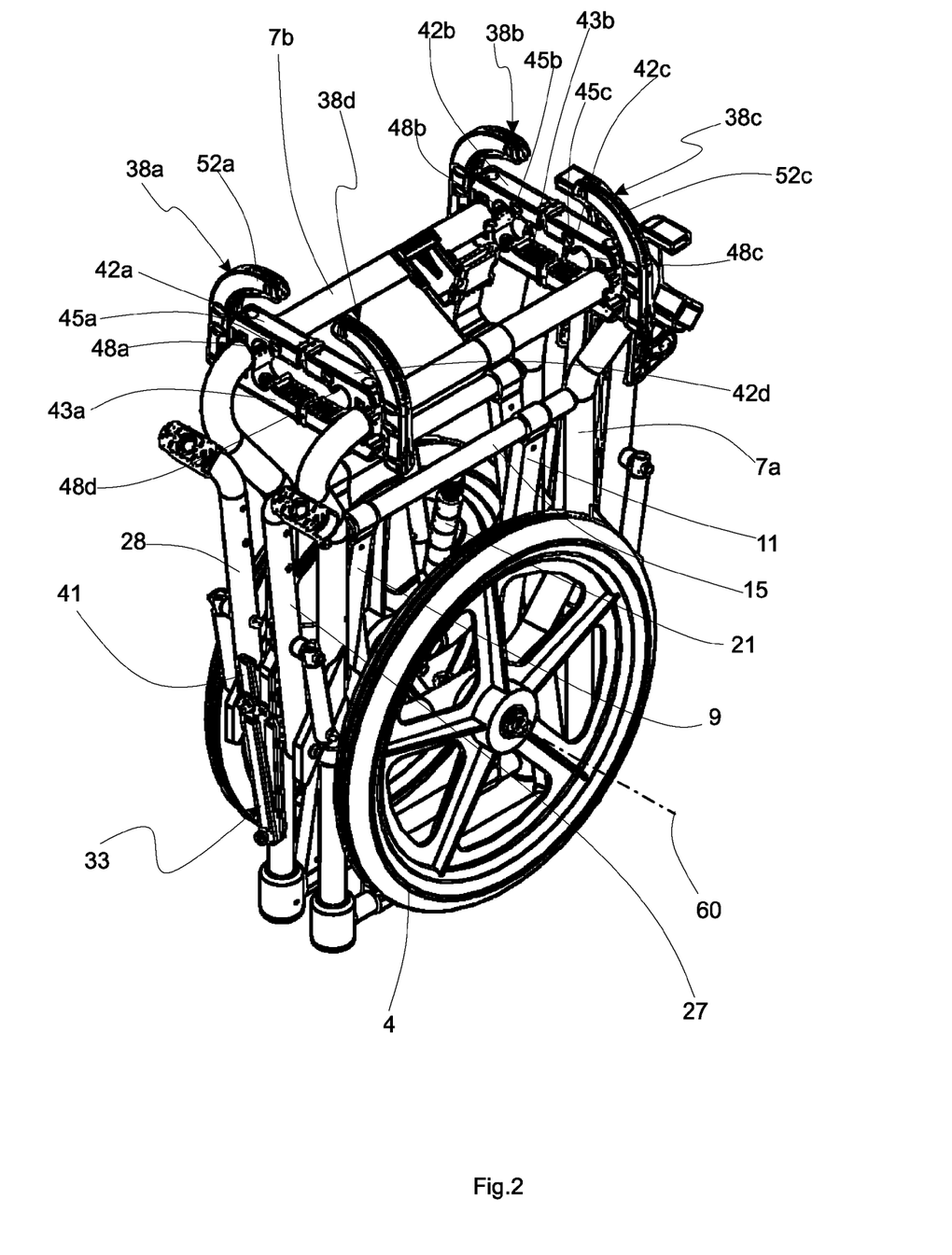
FIG. 2 shows a perspective view of the litter support of FIG. 1 but in a closed arrangement.

Further, said front and rear bucks 27, 28, 29, and are connected two by two by a pair of tubular elements 33 hinged in the center by a hinge point 34. By acting on said pair of tubular elements 33 the litter support 1 is folded (as shown in FIG. 2) or unfolded.

A side base 41 integral with the pair of tubular elements 33, and outwardly projecting from at least one of said two bucks 27 and 28, enables the operator to quicker and easier close the litter support 1 by simply pushing it by a foot. Therefore, by applying a force to said base 41, since the base is integrally connected to one of said two tubular elements of the pair of tubular elements 33, the tubular element, integral with the base, rotates around the hinge point 34 and it rotates also the second tubular element.

FIG. 6 is a detailed view of the rear bucks 29 and 30 of the field litter support 1. In the shown example, in an exemplifying and non limiting way, said bucks 29 and 30 have two mechanisms 36, 37 which act as extension, shown located between a first operative working position, shown by the left buck 29, wherein the mechanism 36 is under the buck 29, and a rest non-operative position, shown by the right buck 30, wherein the mechanism 37 is parallel to the buck 30. Said mechanisms 36 and 37 are positioned in the two cited positions, respectively the operative and non-operative ones, by an elastic element (not shown because is known) such as a spring.

In other words, in order to take the Trendeleburg or anti-Trendeleburg postures, it is necessary that the field litter support 1 is forwardly or backwardly unbalanced. In order to obtain this goal, in an example of the embodiment the rear bucks 29 and 30 can be extended so that the front portion of the field litter support 1 is higher, in other words where the laid down patient has the legs.

Said extension mechanisms 36, 37 can be obviously located on the front bucks 27 and 28 rather than on the rear bucks 29 and 30. In the same way, it is possible to provide one extension mechanism for each bucks 27, 28, 29, and 30, this solution falling anyway in the scope of the attached claims.

Four devices 38a, 38b, 38c, and 38d for hooking the litter are fixable to the handle-shaped portion 7b of each side structures 2 and 3. It can be noted that these devices are located in the horizontal area of the portions 7b of the side structures 2 and 3 in order to stably fixing a litter 100.

Since said hooking devices 38a, 38b, 38c, and 38d are identical, it will be described just one for simplicity.

Device 38a generally comprises two substantially tubular elements 42a and 43a parallelly and specularly located one on the other, connected one to the other in order to form a vice (FIG. 2).

The upper element 42a has a first hole 44a on the shortest side, located inside the litter support 1, and a second through hole 45a on the longest sides.

Said first hole 44a is used in the open arrangement when it is desired to support some spinal boards. In fact, the hole 44a acts as a seat for one of the two ends of a telescopic rod 46 located between the two side structures 2 and 3 orthogonally to the latter.

Figure 7:
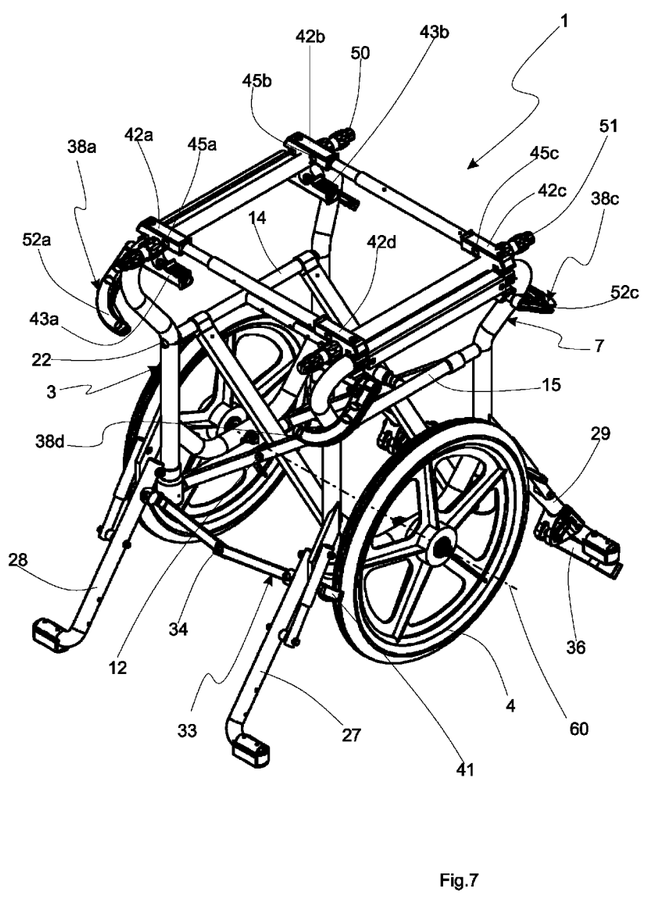
FIGS. 7-9 show sequential operative steps of mounting the field litter on the field litter support object of the present invention.
Figure 10:
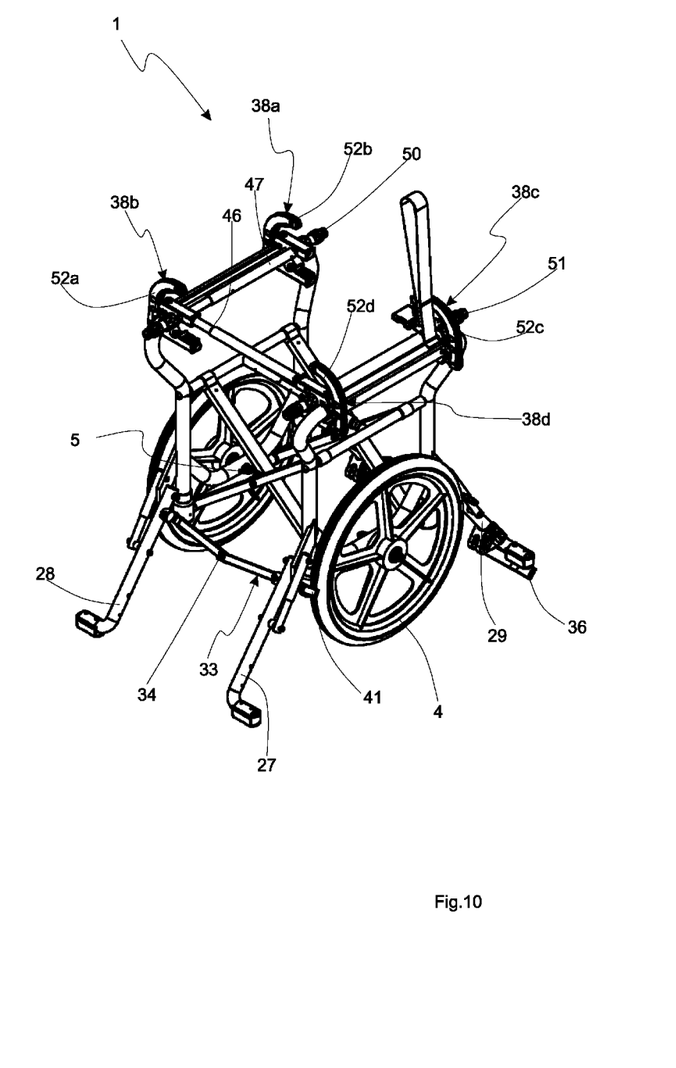
FIGS. 10-12 shows sequential operative steps of mounting an emergency litter on a field litter support according to the present invention.

In other words, as it is clearly shown in FIGS. 1, 7 and 10, in order to arrange the spinal board, or any element having a width smaller than the conventional litters, it is necessary to form a support on the field litter support 1 on which locate the spinal board. Said support is formed by two telescopic rods 46 and 47 which respectively enter holes 44a, 44d, and 44b, 44c of elements 42a, 42b, 42c, and 42d of the hooking devices 38a, 38b, 38c, and 38d.

Instead, through holes 45a, 45b, 45c, and 45d are provided for receiving said telescopic rods 46 and 47 both when they are not necessary (therefore as a function of the type of litter to be positioned), and when the litter support 1 is folded. In the example shown in FIGS. 1 and 10, the rod 47 is parallel to the handle-shaped portion 7b of the side structure 3, inserted in the through holes 45a and 45b of the tubular elements 42a and 42b, while rod 46 is inserted in holes 44a and 44b of elements 42a and 42d.

As it is shown in figures, each element 42a, 42b, 42c, 42d has a seat 48a fixedly receiving a telescopic bar adapted to be grasped by the user, as a handle.

In the attached figures, there are two telescopic bars 50 and 51 respectively hooked to the elements 42a 42b, and elements 42d 42c.

The hooking device 38a further provides an arm 52a having a C-shape downwardly hinged to the outer end of the element 43a around which said arm 52a can rotate in order to cover two main operative positions for respectively hooking and releasing the litter 100. Particularly, an element, for example a spring (not shown in figures), contained in the element 43a, enables the C-shaped arm 52a to enter and exit the two mentioned positions.

Said hooking devices 38a, 38b, 38c, and 38d can be easily and intuitively used by any user.

Figure 8:
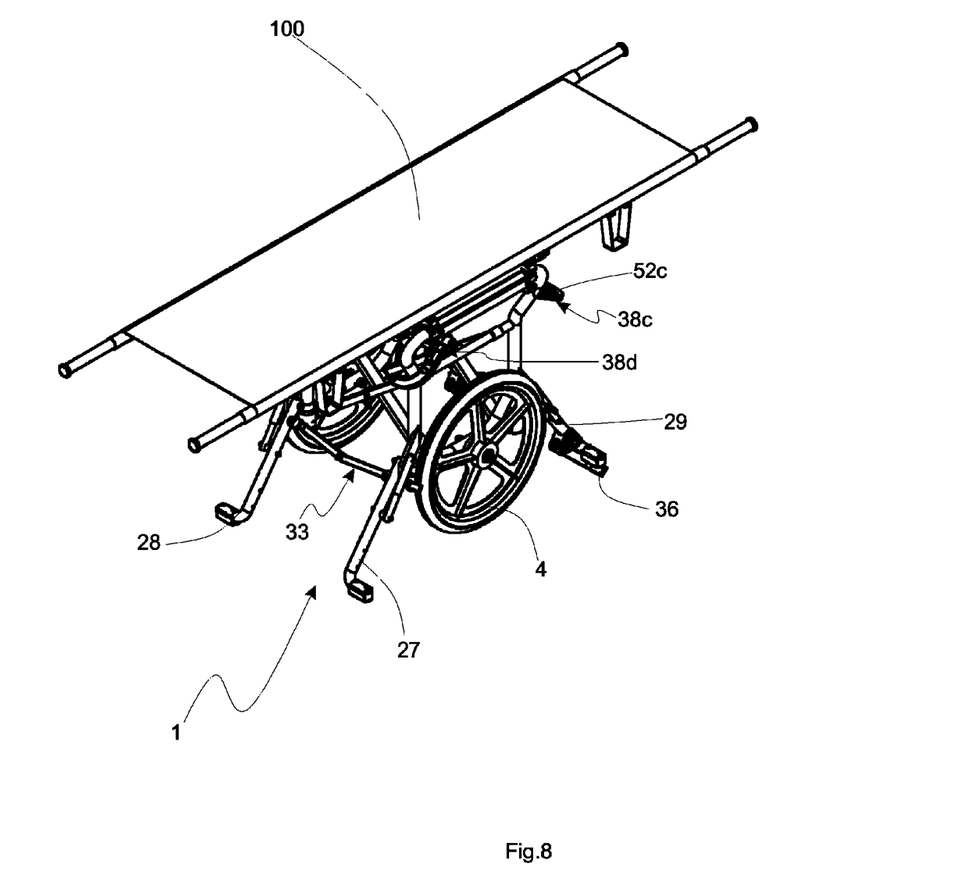
Figure 9:
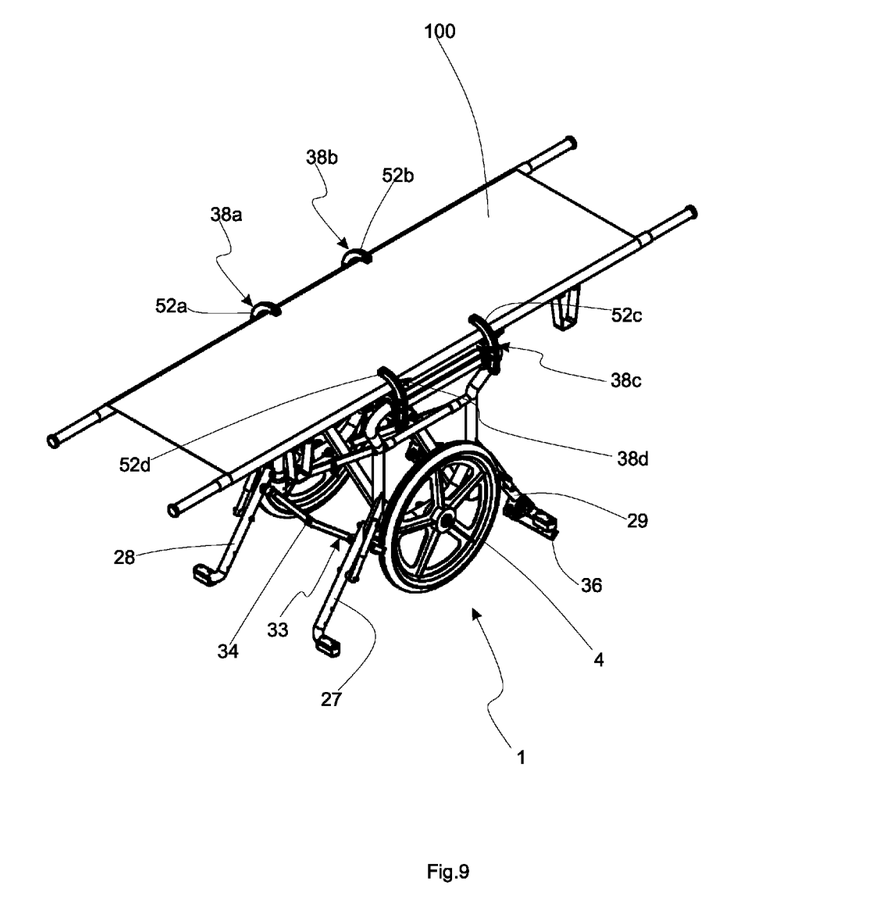

FIGS. 7, 8, and 9 show sequential operative steps for locating an emergency litter 100 on the field litter support 1 and, therefore, the operative positions of arms 52a, 52b, 52c, 53d of the hooking devices 38a, 38b, 38c, and 38d.

Figure 11:
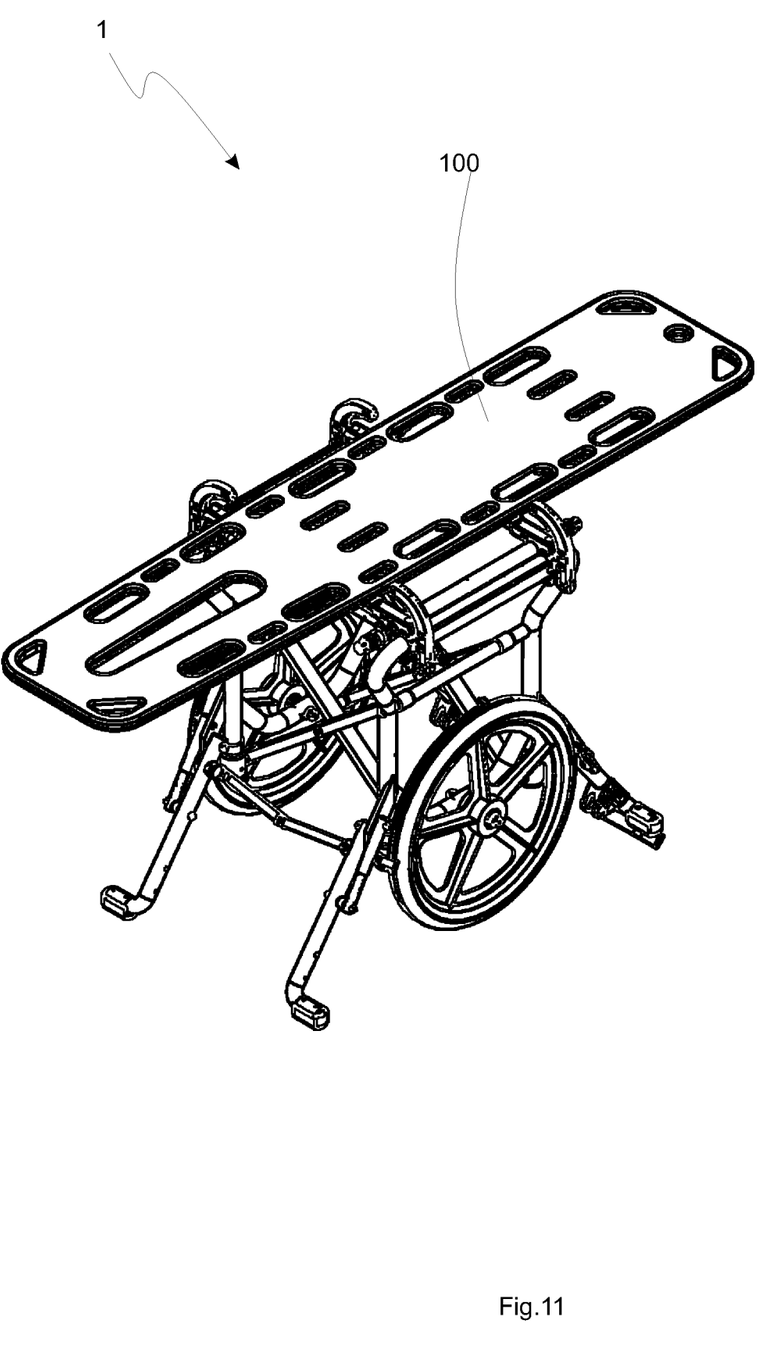
Figure 12:
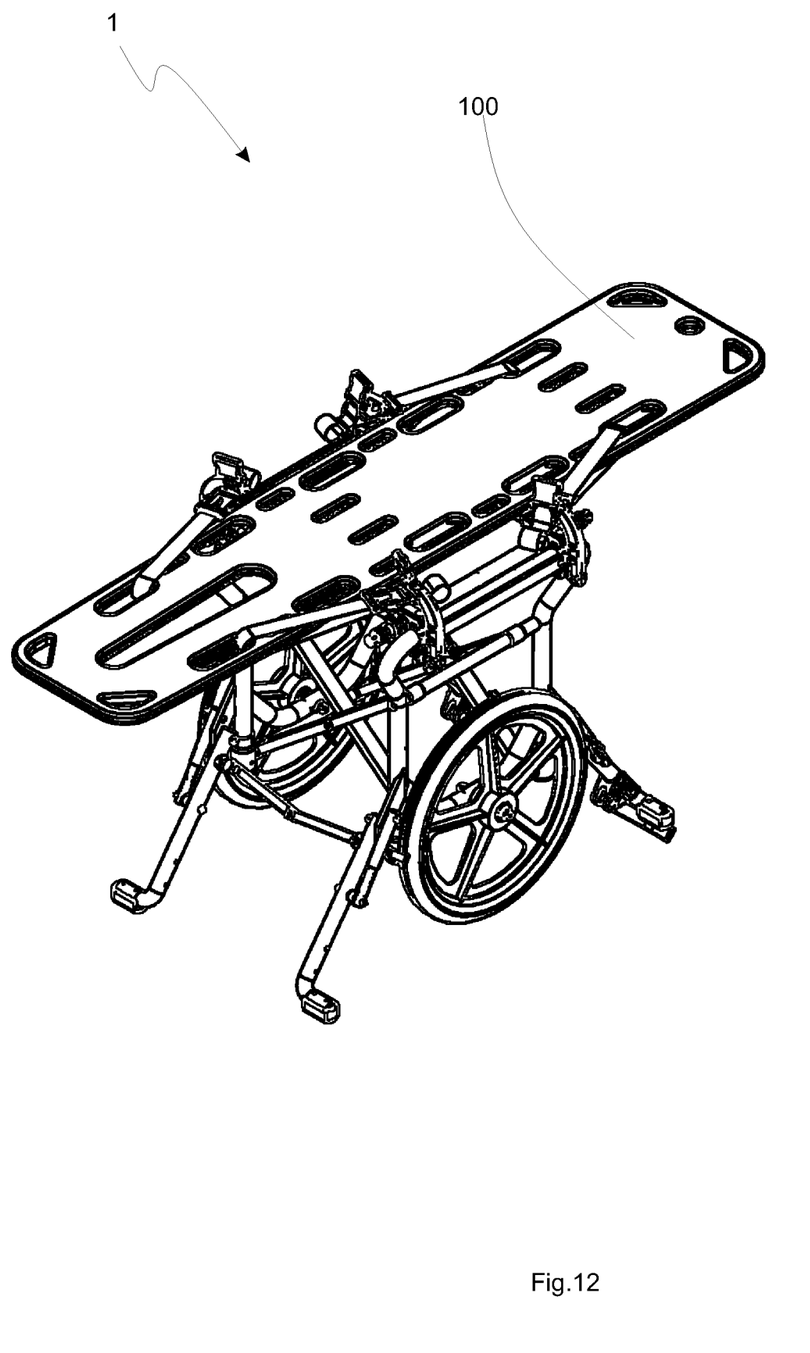

Instead, FIGS. 10, 11, and 12 show sequential operative steps for locating a spinal board 100, or any element having a width less than the conventional litters, on the field litter support 1, according to the present invention.

Figure 13:
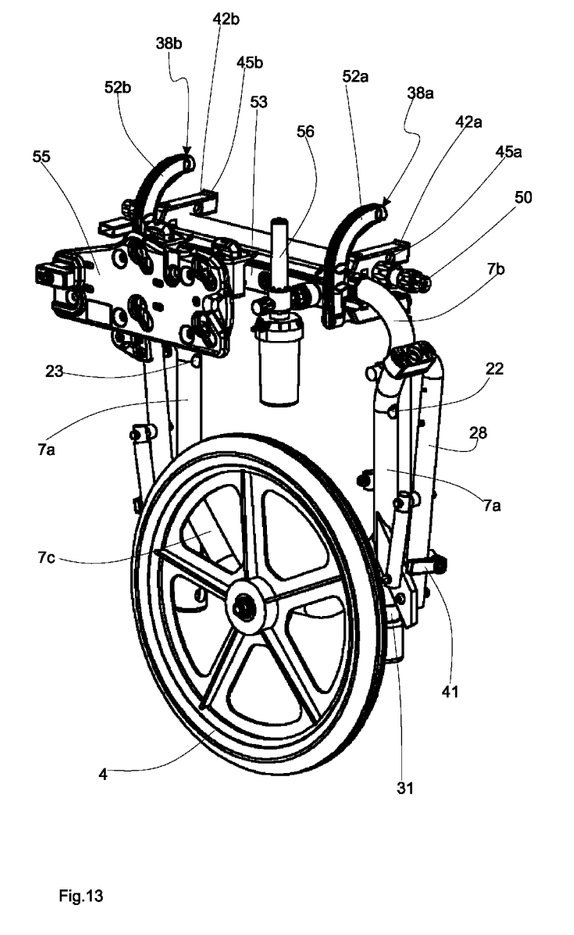
FIG. 13 shows an enlarged detail of the field litter support with some applied accessories.

Lastly, according to the present invention, it is possible to hook to the handle-shaped portions 7b of each side structures 2 and 3, a bar 53 and 54 for hooking fluid distributors and accessories (FIG. 13), such as for example a bottle-holder 55, flow meter 56, phlebo-holder (not shown).

It is pointed out that, thanks to said bars 53 and 54, said litter supports 1 form an autonomous operative medical unit, because, unlike the prior art, advantageously, it is not necessary a further accessories-holder trolley and a further user for moving said trolley. Since the field litter support 1, object of the present invention, has the possibility to also transport the accessories necessary for medical operations, it also enables a reduction of the authorized personnel.

The invention claimed is:
1. A field litter support (1) comprising:
two side structures (2, 3) defining a frame (40), each structure supporting at least one wheel (4);

connecting means (38*a*, 38*b*, 38*c*, 38*d*) for attaching a litter (100) to said frame (40), said connecting means (38*a*, 38*b*, 38*c*, 38*d*) comprising substantially tubular elements (42*a* and 43*a*, 42*b* and 43*b*, 42*c* and 43*c*, 42*d* and 43*d*) parallely and specularly located one on the other;

at least two front and/or back (29, 30) foldable bucks (27, 28) fixable to said side structures (2, 3);

moving means (5) integral with said side structures (2, 3), which enable to reciprocally move close or away the structures (2, 3) themselves along an axis (60) of said wheels (4); and a C-shaped arm (52*a*, 52*b*, 52*c*, 52*d*) rotatably hinged at a bottom to an outer end of the element (43*a*, 43*b*, 43*c*, 43*d*) so that it takes two main operative positions corresponding to connection and disconnection of the litter (100) respectively, wherein so that during the step of closing the field litter support (1) it is not necessary to remove the wheels (4) from their seat, namely axis (60).

2. The field litter support (1) according to claim 1, wherein said moving means (5) comprises at least four rods (8, 9, 10, 11) coupled two by two, centrally pivoted at hinge points (12, 13) and parallely located one to the other, each of said rods (8, 9, 10, 11) having at their ends eyelets (8*a*, 8*b*, 9*a*, 9*b*, 10*a*, 10*b*, 11*a*, 11*b*) engaging upwardly and downwardly four bars (14, 15, 16, 17) fixed to the side structures (2, 3) and on which they can rotate.

3. The field litter support (1) according to claim 1, further comprising a mechanism (6) for blocking moving means (5), and therefore the side structures (2, 3), in a predetermined position, connectable to the side structures (2, 3) themselves.

4. The field litter support (1) according to claim 3, wherein said mechanism (6) is connectable to the bars (14, 15) by means of connection devices located between them.

5. The field litter support (1) according to claim 4, wherein said mechanism (6) is integral with the bars (14, 15), each of them having in their half a further rod (18, 19), and a sleeve (21) keyed to the rod (19), said rods (18, 19) being hinged one to the other at a hinge point (20) and being shaped in order to form together a single rigid rod.

6. The field litter support (1) according to claim 5, wherein the rods (18, 19) comprise a first half (18*a*, 19*a*), at the bars (14, 15) side, having a cylindrical shape, and a second semi-cylindrical-shaped half (18*b*, 19*b*), said rods (18, 19) being hinged together in the respective halves (18*b*, 19*b*) and being shaped in order to form together a single rigid rod.

7. The field litter support (1) according to claim 1, wherein each of the upper elements (42*a*, 42*b*, 42*c*, 42*d*) of the connection devices (38*a*, 38*b*, 38*c*, 38*d*) has a hole (44*a*, 44*b*, 44*c*, 44*d*) on the short side, located towards the inside of the litter support (1),said holes (44*a*, 44*b*, 44*c*, 44*d*) acting as seats for the ends of at least two telescopic rods (46 and 47) orthogonally located between the two side structures (2, 3).

8. The field litter support (1) according to claim 7, wherein each of the upper elements. (42*a*, 42*b*, 42*c*, 42*d*) of the connection devices (38*a*, 38*b*, 38*c*, 38*d*) has a second through hole (45*a*, 45*b*, 45*c*, 45*d*) on the long sides, said through holes (45*a*, 45*b*, 45*c*, 45*d*) acting as a seat for said telescopic rods (46, 47) both when said rods (46, 47) are not necessary and during the folded arrangement of the field litter support (1).

9. The field litter support (1) according to claim 1, wherein the mechanisms (36, 37) acting as extension are connected to the front and/or back (29, 30) foldable bucks (27, 28) enabling the litter (100) to take the antishock Trandeleburg, or anti-Trandeleburg.

10. The field litter support (1) according to claim 1, wherein the structures (2, 3) are moved close or away to each other along the axis (60) of said wheels (4) without disassembling said wheels (4).

11. The field litter support (1) according to claim 1, wherein at least one bar (53) and/or (54) for connecting fluid dispensers and fittings is fixable to the handle-shaped parts (7*b*) of each side structure (2, 3).

12. The field litter support (1) according to claim 2, further comprising a mechanism (6) for blocking moving means (5), and therefore the structures (2, 3), in a predetermined position, connectable to the structures (2, 3) themselves.

13. A field litter support, comprising:
two side structures defining a frame, each structure supporting at least one wheel;
a connector for attaching a litter to said frame, said connector comprising substantially tubular elements parallely and specularly located one on the other;
at least two front and/or back foldable bucks fixable to the side structures;
a mover integral with said side structures, which enable to reciprocally move close or away the structures themselves along an axis of said wheels; and
a C-shaped arm rotatably hinged at a bottom to an outer end of the element so that it takes two main operative positions corresponding to connection and disconnection of the litter respectively,
wherein so that during the step of closing the field litter support it is not necessary to remove the wheels from their seat, namely axis.

14. The field litter support according to claim 13, wherein said mover comprises at least four rods coupled two by two, centrally pivoted at hinge points and parallely located one to the other, each of said rods having at their ends eyelets engaging upwardly and downwardly four bars fixed to the side structures and on which they can rotate.

15. The field litter support according to claim 13, further comprising a mechanism for blocking the mover, and therefore the side structures, in a predetermined position, connectable to the side structuresthemselves.

16. The field litter support according to claim 15, wherein said mechanism for blocking the mover is connectable to the bars by means of connection devices located between them.

17. The field litter support according to claim 16, wherein said mechanism for blocking the mover is integral with the bars, each of them having in their half a further rod, and
a sleeve keyed to the rod,
said rods being hinged one to the other at a hinge point and being shaped in order to form together a single rigid rod.

18. The field litter support according to claim 17, wherein the rods comprise a first half, at the bars side, having a cylindrical shape, and a second semicylindrical-shaped half, said rods being hinged together in the respective halves and being shaped in order to form together a single rigid rod.

19. The field litter support according to claim 13, wherein each of the upper elements of the connection devices has a hole on the short side, located towards the inside of the litter support, said holes acting as seats for the ends of at least two telescopic rods orthogonally located between the two side structures.

* * * * *